US008667113B2

(12) United States Patent
Veerabhadrappa

(10) Patent No.: US 8,667,113 B2
(45) Date of Patent: Mar. 4, 2014

(54) BITMAP NETWORK MANAGEMENT OBJECT CHANGE DETECTION APPROACH

(75) Inventor: Saiprasad Gangalapur Veerabhadrappa, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 346 days.

(21) Appl. No.: 13/049,522

(22) Filed: Mar. 16, 2011

(65) Prior Publication Data

US 2012/0239793 A1    Sep. 20, 2012

(51) Int. Cl.
*G06F 15/173* (2006.01)

(52) U.S. Cl.
USPC ........................................................ 709/223

(58) Field of Classification Search
USPC ........................................................ 709/223
See application file for complete search history.

(56) References Cited

U.S. PATENT DOCUMENTS

| 6,301,266 | B1 * | 10/2001 | Peterson et al. ............... 370/465 |
| 6,539,540 | B1 * | 3/2003 | Noy et al. ...................... 717/141 |
| 7,302,486 | B1 * | 11/2007 | Pai ................................. 709/228 |
| 7,991,865 | B2 * | 8/2011 | Sankaran ....................... 709/223 |
| 2003/0033415 | A1 * | 2/2003 | Graylin et al. ................. 709/229 |
| 2007/0005641 | A1 * | 1/2007 | Hegde et al. ............... 707/103 R |
| 2007/0220157 | A1 * | 9/2007 | Gattu et al. ................... 709/230 |

* cited by examiner

*Primary Examiner* — Glenton B Burgess
*Assistant Examiner* — Benjamin Ailes
(74) *Attorney, Agent, or Firm* — Hickman Palermo; Truong Becker; Bingham Wong LLP

(57) ABSTRACT

Techniques for detecting device changes using SNMP polling are described. In response to determining that an MIB of a managed device has changed, the device's SNMP agent identifies the altered objects in the device's MIB. In response to detecting such a change, the SNMP agent generates a bitmap. This bitmap identifies all the MIB's objects that have changed. The NMS may access and use this bitmap to take further action. For example, the NMS may use the bitmap to poll only the changed objects in the MIB, rather than all of the objects in the MIB (including the unchanged objects). Because fewer than all of the MIB's objects need to be polled in order to identify changes to the managed device, both the burden on the device and the bandwidth required for the polling is significantly reduced.

20 Claims, 5 Drawing Sheets

BITMAP NETWORK MANAGEMENT OBJECT CHANGE DETECTION APPROACH

CLAIM OF PRIORITY TO APPLICATION FILED IN FOREIGN COUNTRY

The present application claims priority under 35 USC §119(a) to an application for patent filed in India on Jan. 6, 2011, the title of that application being "DETECTING CHANGES THROUGH SNMP POLLING," and the application number of that application being 27/DEL/2011.

TECHNICAL FIELD

The present disclosure generally relates to computer networking, and, more specifically, to Simple Network Management Protocol (SNMP).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A network monitoring system (NMS) is a system that constantly monitors a computer network for slow or failing components and that notifies a network administrator (via email, pager or other alarms) in case of outages. An NMS monitors the network for problems caused by overloaded and/or crashed servers, network connections or other devices. For example, to determine the status of a webserver, monitoring software may periodically send Hypertext Transfer Protocol (HTTP) request to fetch a page. To determine the status of an email server, monitoring software may send a test message through Simple Mail Transfer Protocol (SMTP).

Metrics that an NMS commonly measures include server response time, server availability, server uptime, consistency, and reliability. Status request failures usually produce an action from the monitoring system. These actions vary. An alarm may be sent (via Short Message Service (SMS), email, etc.) to the resident system administrator, and/or automatic failover systems may be activated to remove a troubled server from duty until that server can be repaired.

An NMS may use an SNMP polling-based mechanism extensively for collecting large amounts of inventory, configuration, and performance data for a network-connected device. In typical SNMP use, one or more administrative computers called managers have the task of monitoring or managing a group of hosts or devices on a computer network. Each managed system executes, at all times, a software component called an agent which reports information via SNMP to the manager.

Essentially, SNMP agents expose management data on the managed systems as variables. The protocol also permits active management tasks, such as modifying and applying a new configuration through remote modification of these variables. The variables accessible via SNMP are organized in hierarchies. These hierarchies, and other metadata (such as type and description of the variable), are described by management information bases (MIBs).

An SNMP-managed network consists of three key components: a managed device; an agent, which includes software which runs on the managed device; and the NMS, which is software that runs on the manager. A managed device is a network node that implements an SNMP interface that allows unidirectional (read-only) or bidirectional access to node-specific information. Managed devices exchange node-specific information with the NMS. Sometimes called network elements, the managed devices can be any type of device, including, but not limited to, routers, access servers, switches, bridges, hubs, Internet Protocol (IP) telephones, IP video cameras, computer hosts, and printers. An agent is a network management software module that resides on a managed device. An agent has local knowledge of management information and translates that information to or from an SNMP specific form. The NMS executes applications that monitor and control managed devices. An NMS provides the bulk of the processing and memory resources required for network management.

As is mentioned above, an NMS may use a polling-based mechanism to collect inventory, configuration, and performance data for a managed device. The polling interval depends on the type of data being collected. Inventory and configuration data are typically collected less frequently than performance data are. As is mentioned above, SNMP may be used to modify a managed device's configuration through modifying variables in the managed device's MIB. The MIB is a virtual database. Objects in the MIB are defined using a subset of Abstract Syntax Notation One (ASN.1). The database is hierarchical (tree-structured). Entries in the database are addressed through object identifiers (OIDs).

Sometimes, the interval of collection of OIDs through periodic polling can be as high as once every minute. In many cases, the quantity of OIDs to be collected is in the order of thousands. This burdens the network and the devices being polled. For example, it can take up to 100 Kbps of bandwidth to query 40 OIDs. Thus, many management applications typically schedule inventory collection only for times of day when the network usage is very low (e.g., at midnight). This burden on the network and the polled devices becomes exacerbated when there are error conditions such as SNMP timeouts.

The inventory and configuration related OIDs are collected typically for two purposes: change detection and profiling. Change detection involves identifying whether anything in the network has changed, thus identifying the effect of such changes in the network. Profiling involves keeping the inventory and configuration of the network and devices synchronized for the purpose of generating a current profile of managed devices and the network as a whole.

In cases of audits, SNMP polling is even more intensive. A data collection engine involved in performing an audit needs to be very robust. In these cases, the task of polling an entire set of managed objects is highly inefficient, further compounding network and device woes.

In many scenarios, such as in audits, performance monitoring, and optimization, there is a need to identify changes in the managed objects that are being monitored. The changes are typically detected at the NMS level by polling the managed objects and comparing the previously polled OID values with the newly polled present OID values. However, this underlying paradigm of change detection at the NMS level itself is very inefficient since it requires all the managed objects to be polled and then compared with the previous values. Present techniques for change detection are highly inefficient and too burdensome on managed devices and the networks to which those devices are connected.

DETAILED DESCRIPTION

An improved paradigm for change detection in managed devices using SNMP polling is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Change Detection through SNMP Polling
4.0 Implementation Mechanisms—Hardware Overview
5.0 Extensions and Alternatives 1.0 General Overview Improved techniques for detecting changes in managed devices using SNMP polling are described. At the time that an MIB of a managed device is changed, and specifically in response to that change, the managed device's SNMP agent identifies the altered objects in the device's MIB (as opposed to those objects in the MIB which remain unchanged). In response to the change, the SNMP agent generates a bitmap locally at the managed device. This bitmap identifies all the MIB's objects that have changed. The NMS may access and use this bitmap to take further action. For example, the NMS may use the bitmap to poll only the changed objects in the MIB, rather than all of the objects in the MIB (including the unchanged objects). Because fewer than all of the MIB's objects need to be polled in order to identify changes to the managed device, both the burden on the device and the bandwidth required for the polling is significantly reduced.

According to one embodiment of the invention, the following steps are performed. An SNMP agent residing on a managed device detects that one or more objects in a MIB of the managed device have changed. In response to detecting that the objects have changed, the SNMP agent generates a bitmap that identifies which objects of the MIB have changed and which objects of the MIB have not changed. The SNMP agent locally stores the bitmap on the managed device for later access by an NMS that resides on another device that is communicatively coupled to the managed device through a computer network.

In other embodiments, the invention encompasses a computer apparatus and a computer-readable medium configured to carry out the foregoing steps.

2.0 Structural and Functional Overview

Figure 1:
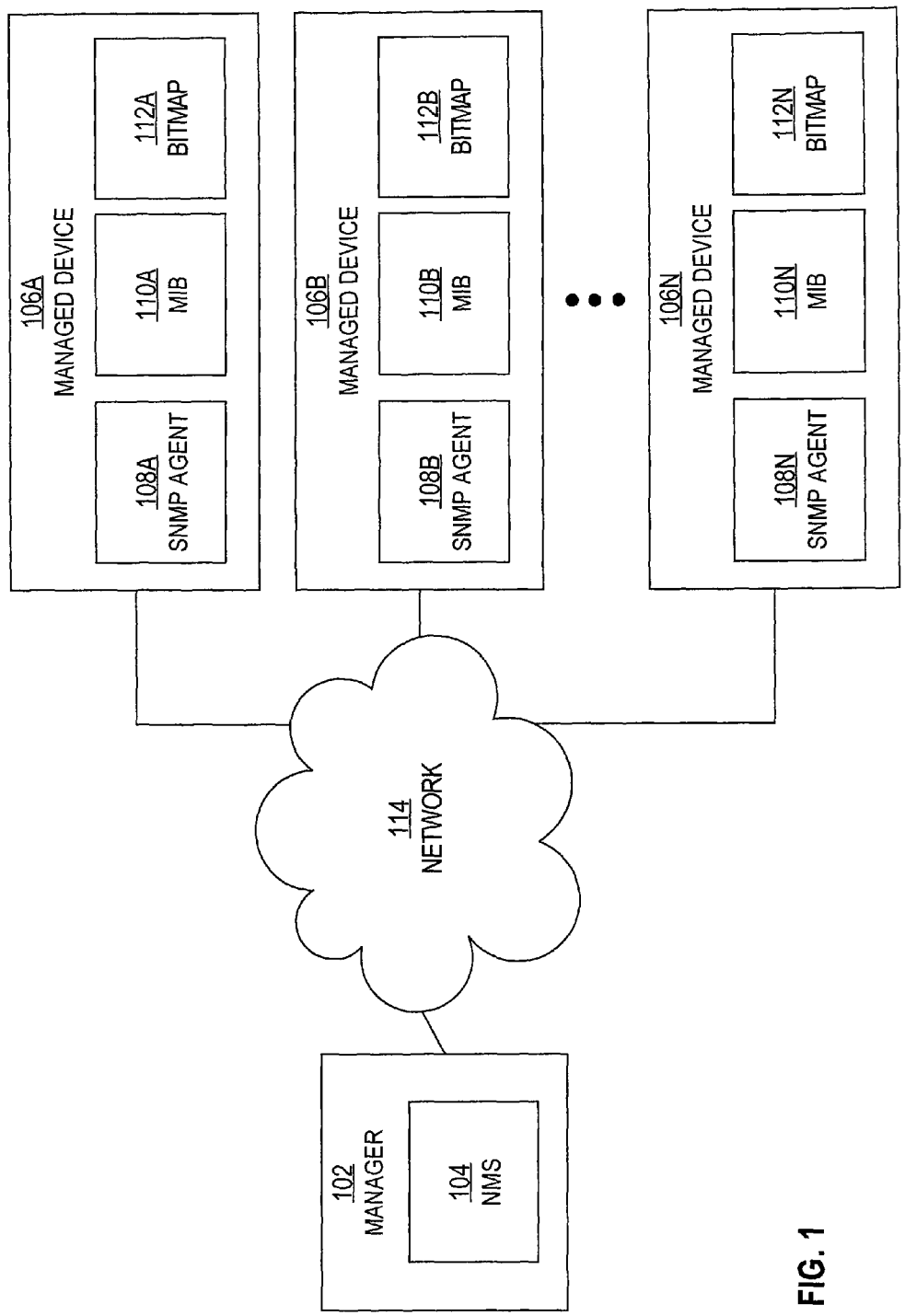
FIG. 1 is a block diagram that illustrates an example of a network system in which an improved SNMP polling-based change detection technique may be used, according to an embodiment of the invention.

FIG. 1 is a block diagram that illustrates an example of a network system in which an improved SNMP polling-based change detection technique may be used, according to an embodiment of the invention. As shown in FIG. 1, the system includes a manager 102 and managed devices 106A-N. Manager 102 may be a device such as a computer that is configured as a server. Managed devices 106A-N may include any of a variety of different devices. For example, various ones of managed devices 106A-N may be desktop computers, laptop computers, printers, copying machines, mobile devices such as cell phones or personal digital assistants, portable or stationary gaming consoles, digital video recorders, etc. Both manager 102 and managed devices 106A-N are communicatively coupled to a network 114. Network 114 may be, or may include, a local area network (LAN), a wide area network (WAN), and/or the Internet. The communicative couplings between manager 102 and network 114, and between each of managed devices 106A-N and network 114, may be over guided or unguided media. For example, manager 102 and managed devices 106A-N may be communicatively coupled with network 114 via Ethernet cables and/or wireless radio connections.

Manager 102 continuously executes an NMS 104. NMS 104 periodically polls specified informational objects maintained within various MIBs of managed devices 106A-N. However, unlike in previous techniques, in which an NMS polled each and every object in a particular managed device's MIB regardless of whether than object had changed since the last time that the NMS had polled that particular managed device, in one embodiment of the invention, NMS 104 polls only the objects (or only a subset of the objects) that have changed in the particular managed device's MIB since the last time that NMS 104 polled that particular managed device; objects that have not changed since the last time that NMS 104 polled that particular managed device are not polled. As will be seen from the discussion below, NMS 104 is capable of determining which of a particular managed device's objects have changed since the last polling of that managed device by consulting a bitmap that is locally generated and maintained at the particular managed device.

Each of managed devices 106A-N includes an SNMP agent 108, a MIB 110, and a bitmap 112. Although bitmaps 112A-N are shown separately from MIBs 110A-N in FIG. 1, in one embodiment of the invention, the information contained within bitmaps 112A-N is actually stored within certain objects within MIBs 110A-N rather than separately from MIBs 110A-N. In FIG. 1, managed device 106A is shown including SNMP agent 108A, MIB 110A, and bitmap 112A; managed device 106B is shown including SNMP agent 108B, MIB 110B, and bitmap 112B; and so on and so forth. For sake of a brief and simple example, the discussion below will refer specifically to managed device 106A and its components, but it should be understood that the discussion relative to managed device 106A and its components may be applied with equal relevance to any of managed devices 106A-N and their components.

Managed device 106A includes SNMP agent 108A. SNMP agent 108A may be an executing software program (i.e., a process) comprising instructions that are stored in a memory of managed device 106A and executed by a processor of managed device 106A. SNMP agent 108A implements SNMP and uses SNMP to receive requests from NMS 104 over network 114, and to respond to those requests over network 114. SNMP agent 108A may set values within MIB 110A and detect when values are changed within MIB 110A.

Managed device 106A includes MIB 110A. MIB 110A is a hierarchy of objects, in which some objects may be descendants of other objects in the tree. Each such object may represent some attribute or characteristic of managed device 106A. These attributes or characteristics may reflect a current configuration of managed device 106A; some attributes and characteristics may be static and immutable, while other attributes and characteristics may be dynamic and mutable. Additionally or alternatively, some objects within MIB 110A may represent up-to-date, periodically updated statistical or performance information about managed device 106A. Each object within MIB 110A has a unique object identifier (OID). The OID for a particular object may be a series of values that is derived from that object's position in the hierarchy. A particular object's OID may comprise an MIB-identifying portion followed by an object-identifying portion. For example, a particular object's OID's object-identifying portion may be a series of (potentially delimited) numbers in which each number corresponds to a different level of the hierarchy, with the first number corresponding to the first level, and so on. The number for a particular level may reflect the position of the particular object's ancestor object among its sibling objects at that level of the hierarchy; for example, if one of the particular object's ancestors is at the third position among its siblings at the second level, then the second number (corresponding to the second hierarchical level) in the particular object's OID's object-identifying portion may be 3 (corresponding to the third position in the second hierarchical level), accordingly. In addition to having a unique OID, each object in the MIB may have a separate value. That value may be a number or a string of characters, for example. The values of some objects in the MIB may change over time.

Managed device 106A further includes bitmap 112A. Although bitmap 112A is shown as being separate from MIB 110A for purposes of explanation, in one embodiment of the invention, the information contained in bitmap 112A is actually stored within certain objects of MIB 110. Collectively, these selected objects of MIB 110 conceptually form the bitmap, although they are, in one embodiment of the invention, contained within MIB 110 itself. In one embodiment of the invention, whenever a change is made to any object within MIB 110, a bit corresponding to that object within bitmap 112A is set to indicate that the corresponding object has changed since the last time that NMS 104 polled managed device 106A. In one embodiment, this change detection is performed by SNMP agent 108A, and SNMP agent 108A sets the bit within bitmap 112A in response to detecting a change in the corresponding object. NMS 104 may access bitmap 112A (or selected portions thereof) in order to ascertain which objects have changed, and which objects have not changed, in MIB 110A since NMS 104 last polled managed device 106A. NMS 104 can use the information within bitmap 112A to request over network 114 only the values of the objects in MIB 110A that have so changed. NMS 104 therefore does not need to request the values of all of the objects in MIB 110A, and does not need to compare the current values of those objects to previous values of those objects in order to determine which objects' values have changed.

3.0 Detecting Changes Through SNMP Polling

As is discussed above, in one embodiment of the invention, the information contained within bitmap 112A is actually stored within MIB 110A itself, and is not maintained separately from MIB 110A. In one embodiment of the invention, MIB 110A includes, in addition to various other objects relating to characteristics and attributes of managed device 106A, two new types of objects. The first new type of object contained in MIB 110A is the "monitorObjects" object. The monitorObjects object is used to start and end a session between NMS 104 and SNMP agent 108A. The value of the monitorObjects object is set and reset by NMS 104. The second new type of object contained in MIB 110A is the "changedObjects" object. The changedObjects object has, as its value, a number which, when converted into a field of bits (the number's binary form), indicates whether objects corresponding to those bits have been changed during the current session between managed device 106A and NMS 104. Each such bit corresponds to some object within MIB 110A, and is set to 1 if the bit's corresponding object has changed during the current session, and is set to 0 if the bit's corresponding object has not changed during the current session. In one embodiment of the invention, at the beginning of each session, the value of each "changedObjects" object in MIB 110A is set to zero by default. In one embodiment of the invention, the object to which a particular bit in the changedObjects object corresponds may be ascertained by that bit's position in the changedObjects object's bit field value, which reflects the position of the corresponding object within the object hierarchy of MIB 110A. This positional relationship will be explained in further detail below.

In one embodiment of the invention, there is an instance of a monitorObjects object and an instance of a changedObjects object at the root of the object hierarchy of MIB 110A. Additionally, in one embodiment of the invention, every object that is a non-leaf node (that is, every object that has no child objects) in the object hierarchy of MIB 110A has a separate instance of a changedObjects object as a child node within the object hierarchy. Thus, in such an embodiment of the invention, the only objects within MIB 110A that do not have changedObjects objects as child nodes are the leaf nodes within the object hierarchy.

3.1 MIB Object Numbering Scheme

Figure 2:
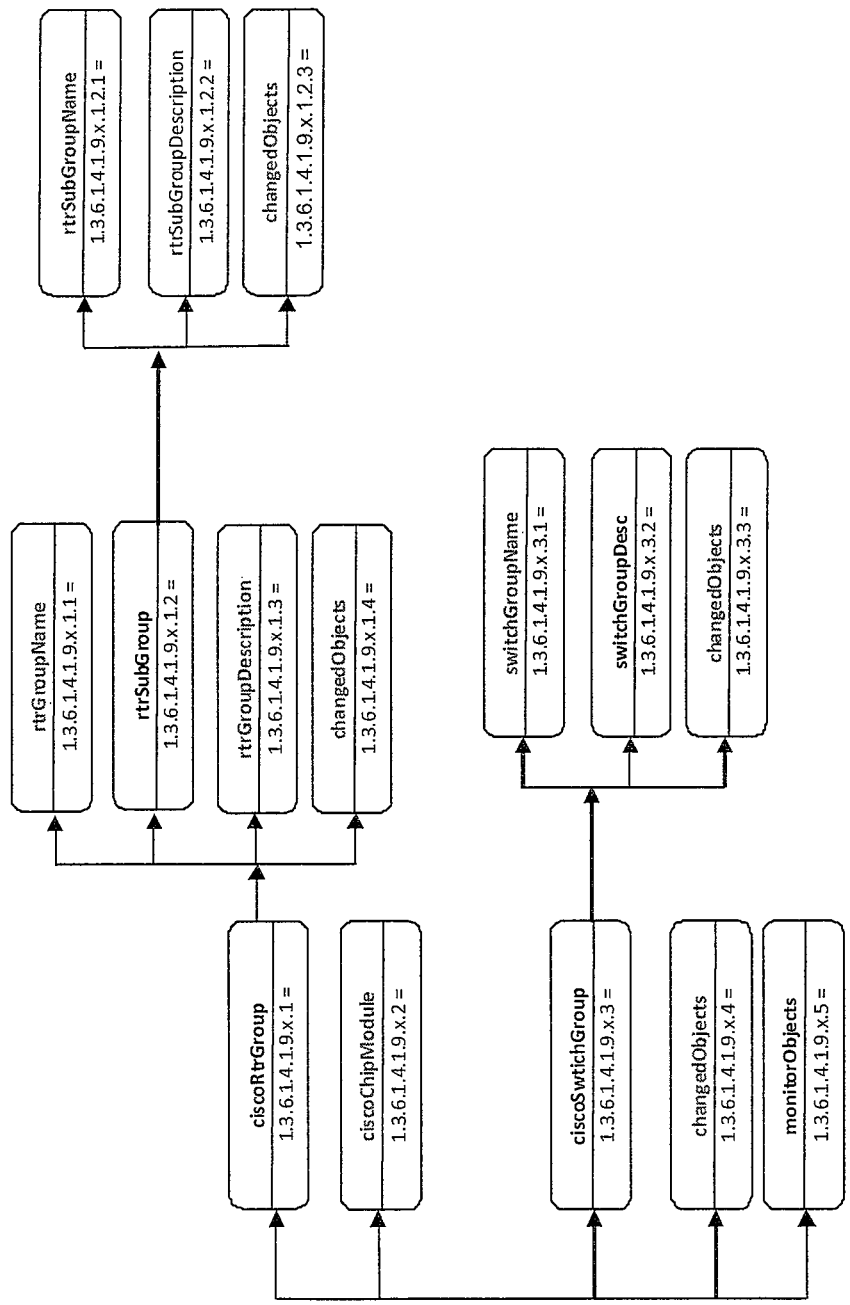
FIG. 2 is a block diagram that illustrates an example of an object hierarchy within a MIB, including a monitorObjects object and multiple changedObjects objects, according to an embodiment of the invention.

FIG. 2 is a block diagram that illustrates an example of an object hierarchy within a MIB, including a monitorObjects object and multiple changedObjects objects, according to an embodiment of the invention. The object hierarchy includes multiple levels of objects. Some objects are children of other objects. The children of objects in level one are found in level two. The children of objects in level two are found in level three. Each object in the object hierarchy has a unique OID that is based on its position within the object hierarchy.

In the example, shown, each OID of each object in the hierarchy begins with "1.3.6.1.4.1.9.x" (the MIB-identifying portion) followed by one or more other numbers (the object-identifying portion). The reason for this is because this particular example MIB is identified by this particular sequence of values, "1.3.6.1.4.1.9.x." Objects of other MIBs might begin with other value sequences.

At the first level of the hierarchy, the next number in any given object's OID (i.e., the first number in that object's OID's object-identifying portion) indicates that object's position among its siblings within that level. As shown in FIG. 2, there are five objects in the first level of the object hierarchy. The first object, "ciscoRtrGroup," is assigned an OID of "1.3.6.1.4.1.9.x.1" to indicate it is in the first position among its siblings (a "1" follows the "x"). The second object, "ciscoChipModule," is assigned an OID of "1.3.6.1.4.1.9.x.2" to indicate it is in the second position among its siblings (a "2" follows the "x"). The third object, "ciscoSwitchGroup," is assigned an OID of "1.3.6.1.4.1.9.x.3" to indicate it is in the third position among its siblings (a "3" follows the "x"). The fourth object, "changedObjects," which is added to the object hierarchy for purposes of an embodiment of the invention, is assigned an OID of "1.3.6.1.4.1.9.x.4" to indicate it is in the fourth position among its siblings (a "4" follows the "x"). The fifth object, "monitorObjects," which is added to the object hierarchy for purposes of an embodiment of the invention, is assigned an OID of "1.3.6.1.4.1.9.x.5" to indicate it is in the fifth position among its siblings (a "5" follows the "x").

According to one embodiment of the invention, the value of the top-level "changedObjects" object (OID 1.3.6.1.4.1.9.x.4) essentially contains the value of bitmap 112A. The manner in which this value of this object becomes populated is described further below following the discussion of the OID numbering scheme.

At each succeeding level, the scheme of making the last number of an object's OID indicative of that object's position among its siblings (that is, the children of its parent) is followed. At each succeeding level, the sequence of values preceding the last number in each object's OID is equal to the OID of that object's parent. For example, the first-level object "ciscoRtrGroup," having an OID of "1.3.6.1.4.1.9.x.1," has four second-level children. Each of these four children has an OID that begins with a sequence that matches the OID of its parent, "1.3.6.1.4.1.9.x.1," but is followed by a number that indicates its position among its siblings.

Regarding the children of "ciscoRtrGroup" (OID 1.3.6.1.4.1.9.x.1), the first object, "rtrGroupName," is assigned an OID of "1.3.6.1.4.1.9.x.1.1" to indicate it is in the first position among its siblings. The second object, "rtrSubGroup," is assigned an OID of "1.3.6.1.4.1.9.x.1.2" to indicate it is in the second position among its siblings. The third object, "rtrGroupDescription," is assigned an OID of "1.3.6.1.4.1.9.x.1.3" to indicate it is in the third position among its siblings. The fourth object, "changedObjects," which is added to the object hierarchy for purposes of an embodiment of the invention, is assigned an OID of "1.3.6.1.4.1.9.x.1.4" to indicate it is in the fourth position among its siblings.

Continuing the example, the first-level object "ciscoSwitchGroup," having an OID of "1.3.6.1.4.1.9.x.3," has three second-level children. Each of these three children has an OID that begins with a sequence that matches the OID of its parent, "1.3.6.1.4.1.9.x.3," but is followed by a number that indicates its position among its siblings. Regarding the children of "ciscoSwitchGroup" (OID 1.3.6.1.4.1.9.x.3), the first object, "switchGroupName," is assigned an OID of "1.3.6.1.4.1.9.x.3.1" to indicate it is in the first position among its siblings. The second object, "switchGroupDesc," is assigned an OID of "1.3.6.1.4.1.9.x.3.2" to indicate it is in the second position among its siblings. The third object, "changedObjects," which is added to the object hierarchy for purposes of an embodiment of the invention, is assigned an OID of "1.3.6.1.4.1.9.x.3.3" to indicate it is in the third position among its siblings.

The OID numbering scheme continues at the third level and lower levels of the hierarchy as well. Continuing the example, the second-level object "rtrSubGroup," having an OID of "1.3.6.1.4.1.9.x.1.2," has three third-level children. Each of these three children has an OID that begins with a sequence that matches the OID of its parent, "1.3.6.1.4.1.9.x.1.2," but is followed by a number that indicates its position among its siblings. Regarding the children of "rtrSubGroup" (OID 1.3.6.1.4.1.9.x.1.2), the first object, "rtrSubGroupName," is assigned an OID of "1.3.6.1.4.1.9.x.1.2.1" to indicate it is in the first position among its siblings. The second object, "rtrSubGroupDescription," is assigned an OID of "1.3.6.1.4.1.9.x.1.2.2" to indicate it is in the second position among its siblings. The third object, "changedObjects," which is added to the object hierarchy for purposes of an embodiment of the invention, is assigned an OID of "1.3.6.1.4.1.9.x.1.2.3" to indicate it is in the third position among its siblings.

3.2 Updating Bit Fields Concurrent with Object Changes

With the OID numbering scheme described above, an example of the use of a change detection technique relative to the example MIB of FIG. 2 is now discussed. To initiate a new session with managed device 106A, NMS 104 sets the value of the lone "monitorObjects" object (OID 1.3.6.1.4.1.9.x.5) to "start." At this point, a new monitoring session starts. During the monitoring session, all changes within MIB 110A are detected. If, during the session, the value of the "rtrGroupName" object (OID 1.3.6.1.4.1.9.x.1.1) changes from "rtr-chg" to "rtr-SJ," then, in response to changing that value, SNMP agent 108A also does the following:

First, SNMP agent 108A determines that the "rtrGroupName" object (OID 1.3.6.1.4.1.9.x.1.1) has a positional value of "1" among its siblings, as evidenced by the final number in its OID. SNMP agent 108A determines that, among the siblings of the "rtrGroupName" object (OID 1.3.6.1.4.1.9.x.1.1), the object that contains the bit field that indicates changes to those siblings is the "changedObjects" object (OID 1.3.6.1.4.1.9.x.1.4). That particular bit field contains four bits: one for each of "rtrGroupName" (OID 1.3.6.1.4.1.9.x.1.1), "rtrSubGroup" (OID 1.3.6.1.4.1.9.x.1.2), "rtrGroupDescription" (OID 1.3.6.1.4.1.9.x.1.3), and "changedObjects" (OID 1.3.6.1.4.1.9.x.1.4), all of which are the children of "ciscoRtrGroup" (OID 1.3.6.1.4.9.x.1). Because the first of these sibling objects has changed, SNMP agent 108A sets the first bit of the "changedObjects" object's (OID 1.3.6.1.4.1.9.x.1.4) bit field value to 1.

However, in altering the bit field, SNMP agent 108A detects that the very value of the "changedObjects" object (OID 1.3.6.1.4.1.9.x.1.4)—the bit field itself—has changed. Therefore, in response to detecting this change, SNMP agent 108A sets the fourth (because "changedObjects" (OID 1.3.6.1.4.1.9.x.1.4) is fourth among its siblings, as evidenced by the final number in its OID) bit of the bit field object to 1. Consequently, the value of the bit field becomes "1001."

Even if the "rtrGroupName" object (OID 1.3.6.1.4.1.9.x.1.1) or the "changedObjects" object (OID 1.3.6.1.4.1.9.x.1.4) should be modified again during the session, if these are the only objects that are modified during the session, then the value of the bit field stored in the "changedObjects" object (OID 1.3.6.1.4.1.9.x.1.4) will not be further modified, since the 1 bits currently set in the bit field already indicate that those objects were changed at least once during the current session.

Continuing the foregoing example, if, during the session, the value of the "switchGroupName" object (OID 1.3.6.1.4.1.9.x.3.1) changes from its current value to a different value, then, in response to changing that value, SNMP agent 108A also does the following:

First, SNMP agent 108A determines that the "switchGroupName" object (OID 1.3.6.1.4.1.9.x.3.1) has a positional value of "1" among its siblings, as evidenced by the final number in its OID. SNMP agent 108A determines that, among the siblings of the "switchGroupName" object (OID 1.3.6.1.4.1.9.x.3.1), the object that contains the bit field that indicates changes to those siblings is the "changedObjects" object (OID 1.3.6.1.4.1.9.x.3.3). It should be noted that this is a different "changedObjects" object than the "changedObjects" object previously discussed above (OID 1.3.6.1.4.1.9.x.1.4), although both may be separate instances of the same class ("changedObjects"). The bit field stored within the "changedObjects" object (OID 1.3.6.1.4.1.9.x.3.3) contains just three bits: one for each of "switchGroupName" (OID 1.3.6.1.4.1.9.x.3.1), "switchGroupDesc" (OID 1.3.6.1.4.1.9.x.3.2), and "changedObjects" (OID 1.3.6.1.4.1.9.x.3.3), all of which are the children of "ciscoSwitchGroup" (OID 1.3.6.1.4.9.x.3). Because the first of these sibling objects has changed, SNMP agent 108A sets the first bit of the "changedObjects" object's (OID 1.3.6.1.4.1.9.x.3.3) bit field value to 1.

However, in altering the bit field, SNMP agent 108A detects that the very value of the "changedObjects" object (OID 1.3.6.1.4.1.9.x.3.3)—the bit field itself—has changed. Therefore, in response to detecting this change, SNMP agent 108A sets the third (because "changedObjects" (OID 1.3.6.1.4.1.9.x.3.3) is third among its siblings, as evidenced by the final number in its OID) bit of the bit field object to 1. Consequently, the value of the bit field becomes "101."

Eventually, NMS 104 will end the current session with managed device 106A by setting the value of the lone "monitorObjects" object (OID 1.3.6.1.4.1.9.x.5) to "end." Because this value has changed during the session, SNMP agent 108A will set the fifth bit of the top-level "changedObjects" object (OID 1.3.6.1.4.1.9.x.4) to 1. The changing of the top-level "changedObjects" object (OID 1.3.6.1.4.1.9.x.4) itself will cause the SNMP agent 108A to set the fourth bit of the top-level "changedObjects" object (OID 1.3.6.1.4.1.9.x.4) to 1 also, making the value of the top-level "changedObjects" object (OID 1.3.6.1.4.1.9.x.4) "00011."

At this point in the example, in response to the setting of the value of the lone "monitorObjects" object (OID 1.3.6.1.4.1.9.x.5) to "end," the current monitoring session ends. Assuming that no other changes to any of the MIB's objects have occurred during the session other than the changes described above, the value of the top-level "changedObjects" object (OID 1.3.6.1.4.1.9.x.4) will be "00011," the value of the first second-level "changedObjects" object (OID 1.3.6.1.4.1.9.x.1.4) will be "1001," the value of the second second-level "changedObjects" object (OID 1.3.6.1.4.1.9.x.3.3) will be "101," and the value of the third-level "changedObjects" object (OID 1.3.6.1.4.1.9.x.1.2.3) will remain "000" (unchanged).

3.3 Re-Computing Bit Field Values at Session Conclusion Based on Bit Field Values Lower in Same Branches The ending of the current session causes SNMP agent 108A to perform a bottom-up, right-to-left traversal of the MIB tree, updating various "changedObjects" objects along the way. During the bottom-up traversal, if any parent object has a child "changedObjects" object, then, in the bit field of the "changedObjects" object that is the sibling of that parent object, SNMP agent 108A replaces (a) the bit corresponding to the parent object's position among its siblings with (b) the value of the child "changedObjects" object. According to one embodiment of the invention, the replacement described below is performed via multiple successive "passes," with the first pass updating the lowest non-leaf level of "changedObjects" objects in the MIB hierarchy, and each subsequent pass updating the next-highest level of "changedObjects" objects in the MIB hierarchy based on the changes made in the previous pass. An example of the performance of this bottom-up traversal of the MIB tree assuming the values discussed above is now discussed for purposes of illustration.

During the bottom-up traversal, SNMP agent 108A eventually encounters the "rtrSubGroup" object (OID 1.3.6.1.4.9.x.1.2). SNMP agent 108A determines that the "rtrSubGroup" object (OID 1.3.6.1.4.9.x.1.2) has a "changedObjects" child—specifically, the third-level "changedObjects" object (OID 1.3.6.1.4.1.9.x.1.2.3). In response to determining that the "rtrSubGroup" object (OID 1.3.6.1.4.9.x.1.2)—the parent object in this case—has a "changedObjects" child, SNMP agent 108A makes a replacement in the "changedObjects" sibling of the parent object. In this case, the "changedObjects" sibling of the parent object is the first second-level "changedObjects" object (OID1.3.6.1.4.1.9.x.1.4). The current value of the first second-level "changedObjects" object (OID1.3.6.1.4.1.9.x.1.4) is "1001." SNMP agent 108A replaces the second bit of this bit field (corresponding to the position of the parent object (OID 1.3.6.1.4.9.x.1.2)—the second of its siblings) with the value of the child "changedObjects" object (OID 1.3.6.1.4.1.9.x.1.2.3), which is "000." As a result, the value of the first second-level "changedObjects" object (OID1.3.6.1.4.1.9.x.1.4) becomes "100001," as the original second "0" of that bit field has been replaced with "000."

Continuing the bottom-up traversal, SNMP agent 108A eventually encounters the "ciscoSwitchGroup" object (OID 1.3.6.1.4.9.x.3). SNMP agent 108A determines that the "ciscoSwitchGroup" object (OID 1.3.6.1.4.9.x.3) has a "changedObjects" child—specifically, the second second-level "changedObjects" object (OID 1.3.6.1.4.1.9.x.3.3). In response to determining that the "ciscoSwitchGroup" object (OID 1.3.6.1.4.9.x.3)—the parent object in this case—has a "changedObjects" child, SNMP agent 108A makes a replacement in the "changedObjects" sibling of the parent object. In this case, the "changedObjects" sibling of the parent object is the first-level "changedObjects" object (OID1.3.6.1.4.1.9.x.4). The current value of the first-level "changedObjects" object (OID1.3.6.1.4.1.9.x.4) is "00011." SNMP agent 108A replaces the third bit of this bit field (corresponding to the position of the parent object (OID 1.3.6.1.4.9.x.3)—the third of its siblings) with the value of the child "changedObjects" object (OID 1.3.6.1.4.1.9.x.3.3), which is "101." As a result, the value of the first-level "changedObjects" object (OID1.3.6.1.4.1.9.x.4) becomes "0010111," as the original third "0" of that bit field has been replaced with "101."

Continuing the bottom-up traversal, SNMP agent 108A eventually encounters the "ciscoRtrGroup" object (OID 1.3.6.1.4.9.x.1). SNMP agent 108A determines that the "ciscoRtrGroup" object (OID 1.3.6.1.4.9.x.1) has a "changedObjects" child—specifically, the first second-level "changedObjects" object (OID 1.3.6.1.4.1.9.x.1.4). In response to determining that the "ciscoRtrGroup" object (OID 1.3.6.1.4.9.x.1)—the parent object in this case—has a "changedObjects" child, SNMP agent 108A makes a replacement in the "changedObjects" sibling of the parent object. In this case, the "changedObjects" sibling of the parent object is, again, the first-level "changedObjects" object (OID1.3.6.1.4.1.9.x.4). The current value of the first-level "changedObjects" object (OID1.3.6.1.4.1.9.x.4), after the recent replacement discussed above, is "0010111." SNMP agent 108A replaces the first bit of this bit field (corresponding to the position of the parent object (OID 1.3.6.1.4.9.x.1)—the first of its siblings) with the value of the child "changedObjects" object (OID 1.3.6.1.4.1.9.x.1.4), which is now "100001" as a consequence of a previous replacement. As a result, the value of the first-level "changedObjects" object (OID1.3.6.1.4.1.9.x.4) becomes "100001010111," as the original first "0" of that bit field has been replaced with "100001."

As there are no further un-traversed parent objects having a child "changedObjects" object in the MIB tree, the end-of-session bottom-up traversal and replacement is complete.

Thus, the final value of the first-level "changedObjects" object (OID1.3.6.1.4.1.9.x.4) for the most recently ended session is "100001010111." This, then, is the final value of bitmap 112A for the most recently ended session. Beneficially, NMS 106 can then simply poll the first-level "changedObjects" object (OID1.3.6.1.4.1.9.x.4) to determine precisely which of the objects in the entire MIB tree have changed during the most recently ended session. If NMS 106 is interested in learning the values of those objects, then NMS 106 can subsequently poll those objects individually without polling any other object in the MIB tree; NMS 106 does not need to poll any object other than the top-level "changedObjects" object in order to discover which objects have changed. Alternatively, if NMS 106 only needs to determine which objects in a specified sub-tree of the MIB tree have changed, then NMS 106 can simply poll the "changedObjects" object that is at the top level of that specified sub-tree. This technique therefore saves a great deal of bandwidth, memory, and time when compared to a less-effective approach in which every object in a MIB tree had to be polled, and its current value compared to a previously recorded value, in order to discover whether that object had changed since the last session.

If NMS 106 needs to keep an inventory and configuration of managed device 106A up-to-date, then NMS 106 may start monitoring for changed objects, get the OIDs of the changed objects based on the values of the changedObjects objects, and then after getting these values, use a "getBulk" operation with the OIDs of the changed objects to get all of the variable bindings for the objects that have changed (and only those objects).

3.4 Example Flow

Figure 3:
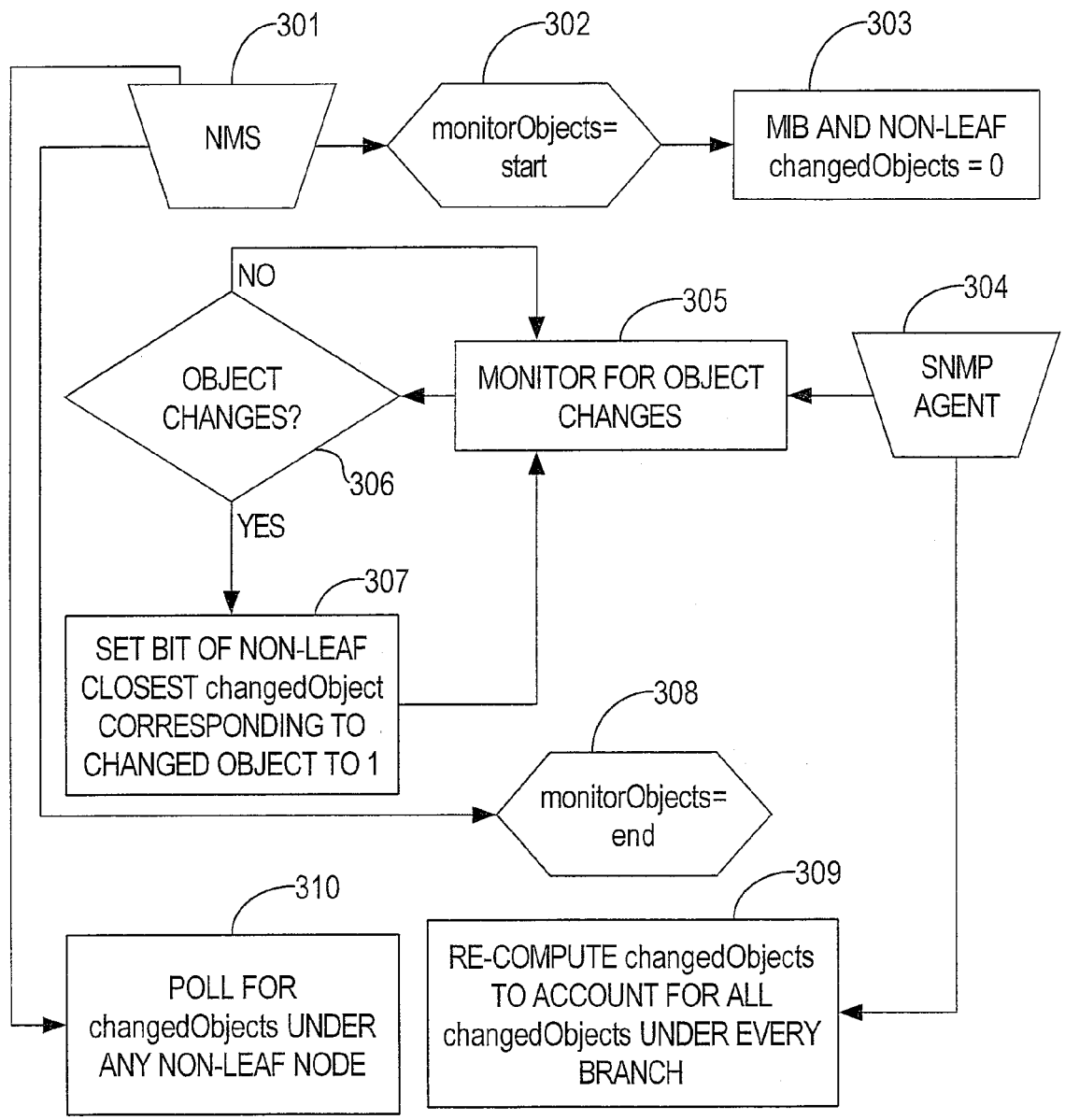
FIG. 3 is a flow diagram that illustrates a technique for discovering changes to objects in a MIB using a bitmap maintained through techniques described herein, according to an embodiment of the invention.

FIG. 3 is a flow diagram that illustrates a technique for discovering changes to objects in a MIB using a bitmap maintained through techniques described herein, according to an embodiment of the invention. At the start of a session, in step 302, NMS 301 sets the value of the root-level "monitorObjects" object to "start," thereby beginning a new monitoring session. Next, in step 303, the values of MIB and non-leaf "changedObjects" objects are initialized to "0" (i.e., all bits in their bit fields are set to zero; the quantity of bits in each bit field may vary, as seen from the discussion above).

Next, in step 305, SNMP agent 304 monitors for object changes. In step 306, if SNMP agent 304 determines that there has not been any object change, then control passes back to step 305. Alternatively, in step 306, if SNMP agent 304 determines that an object has changed, then control passes to step 307. In step 307, in the bit field of the non-leaf "changedObjects" object that is closest to the particular object in which a change has been detected, SNMP agent 304 sets the bit at the position corresponding to the particular object's position among its siblings to 1. Control then passes back to step 305.

Eventually, potentially after multiple iterations of steps 305-307 have occurred relative to various different object in the MIB, in step 308, NMS 301 sets the value of the root-level "monitorObjects" object to "end," thereby ending the most recent monitoring session. In response to the ending of the monitoring session in this manner, in step 309, SNMP agent 304 re-computes the values of the "changedObjects" objects in the MIB to account for values of "changedObjects" children of those objects under each branch of the MIB. In one embodiment of the invention, this re-computation is accomplished by SNMP agent 304 performing the bottom-up traversal and replacement of bits of higher-level "changedObjects" objects with values of lower-level "changedObjects" objects' bit fields, in the manner described in the example above. This produces the final values of the "changedObjects" objects for the most recently ended session.

In step 310, after the final values of the "changedObjects" object have been re-computed as discussed above, NMS 301 may poll the "changedObjects" object under any non-leaf node in order to determine which of the objects in the sub-tree in whose root the "changedObjects" object occur have changed during the most recently ended session.

Thus, according to one embodiment of the invention, bitmap-based change detection of SNMP managed objects is performed at the SNMP agent layer, within each managed device. Furthermore, according to one embodiment of the invention, only the changed SNMP-managed objects are polled by the NMS, rather than both the changed and unchanged objects. Unlike in some prior approaches, an embodiment of the invention described herein avoids the need to persistently store a large data structure in the NMS in order to permit comparison of previously polled object values to currently polled object values in order to determine which objects have changed. According to one embodiment of the invention, the techniques described herein are accomplished with fairly simple bit operations. The re-computation of the "changedObjects" object values may be accomplished in only a few passes—at most, a number of passes equal to the depth of the MIB tree.

Advantageously, according to an embodiment of the invention, the change detection technique described above is performed closer to the objects which are changing; the SNMP agent within the managed device performs most of the technique. This positioning makes the technique very efficient. The NMS does not need to poll all of the parameters in order to detect what has changed. Instead, the NMS can poll only the parameters that have changed, after determining which parameters have changed from the "changedObjects" objects, and then analyze only the delta.

According to an embodiment of the invention, the polling is very efficient because only the changed MIB object data, rather than all of the MIB object data, may be polled. Instead of consuming 100 KBPS of bandwidth to collect 40 SNMP objects, next to no bandwidth is consumed under the best case using the foregoing technique.

According to an embodiment of the invention, the foregoing SNMP agent-performed monitoring technique is not enabled by default, but, instead, is only activated in response to the NMS setting the value of the root-level "monitorObjects" to "start." Consequently, the technique is completely controllable by the NMS.

Advantageously, the ability to monitor just a few groups of objects for changes, rather than all objects, makes management very flexible. In one embodiment of the invention, the "changedObjects" based change detection techniques described above may be performed relative to only a subset of the entire MIB data—such as relative to scalar data—which other more conventional polling techniques may continue to be used relative to the remainder of the MIB data—such as relative to entries encapsulated within tables. In one embodiment of the invention, the user of NMS 104 specifies which sub-trees of the MIBs for each of managed devices 106A-N will be managed using the techniques described above, and only these specified sub-trees are so managed, accordingly.

According to one embodiment of the invention, polling frequency can be set to be the least common denominator for inventory data polling frequency, configuration data polling frequency, and performance data polling frequency. If inventory data is being polled, then the polling potentially can be performed just once per day in order to determine which data have changed.

Beneficially, according to one embodiment of the invention, techniques described herein do not require any modification to the behavior of existing SNMP implementations. One or more embodiments of the invention may be implemented using an extension to existing SNMP without changing existing portions thereof. As a result, such embodiments of the invention are capable of operating in existing SNMP networks and will not disrupt the operation of legacy SNMP-capable devices. Such embodiments can operate in conjunction with legacy MIBs as well as with future MIBs.

Figure 5:
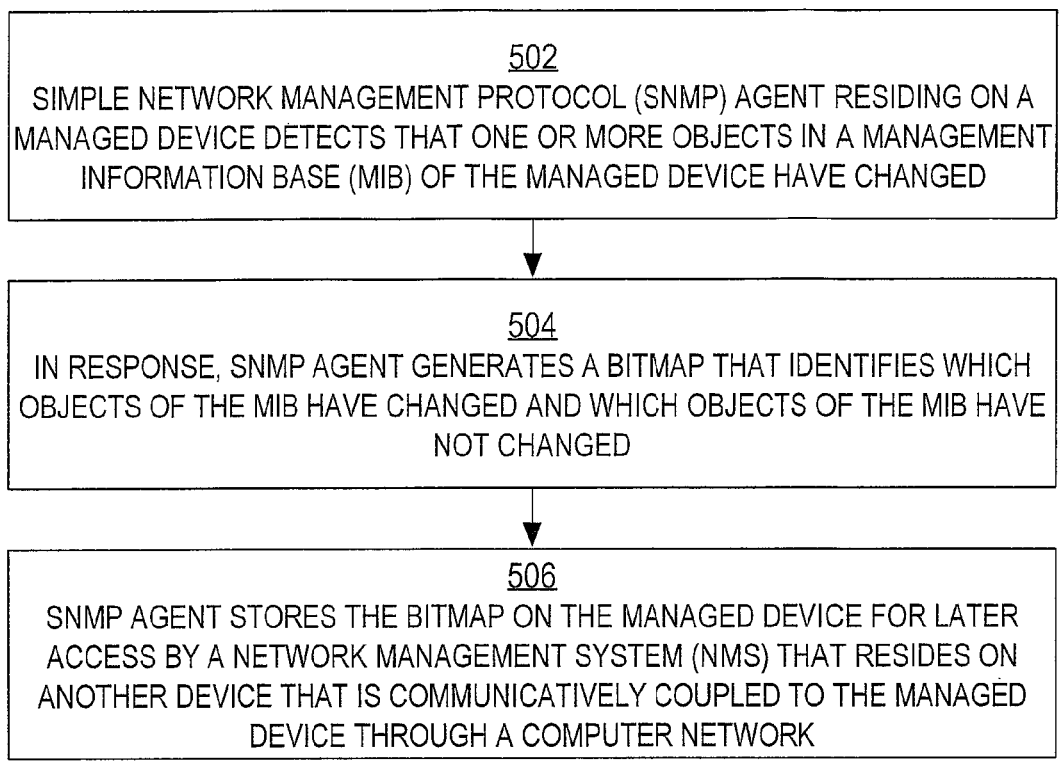
FIG. 5 is a flow diagram that illustrates a high-level overview of a technique that an SNMP agent executing on a managed device may perform in order to generate bitmaps that indicate, to an NMS, precisely which objects within a MIB have changed during a most recent monitoring session.

FIG. 5 is a flow diagram that illustrates a high-level overview of a technique that an SNMP agent executing on a managed device may perform in order to generate bitmaps that indicate, to an NMS, precisely which objects within a MIB have changed during a most recent monitoring session. Alternative embodiments of the invention may performed additional, fewer, or different steps than those discussed with reference to FIG. 5. In block 502, a Simple Network Management Protocol (SNMP) agent residing on a managed device detects that one or more objects in a management information base (MIB) of the managed device have changed. In block 504, in response to the detecting performed in block 502, the SNMP agent generates a bitmap that identifies which objects of the MIB have changed and which objects of the MIB have not changed. In block 506, the SNMP agent stores the bitmap on the managed device for later access by a network management system (NMS) that resides on another device that is communicatively coupled to the managed device through a computer network.

4.0 Implementation Mechanisms—Hardware Overview

Figure 4:
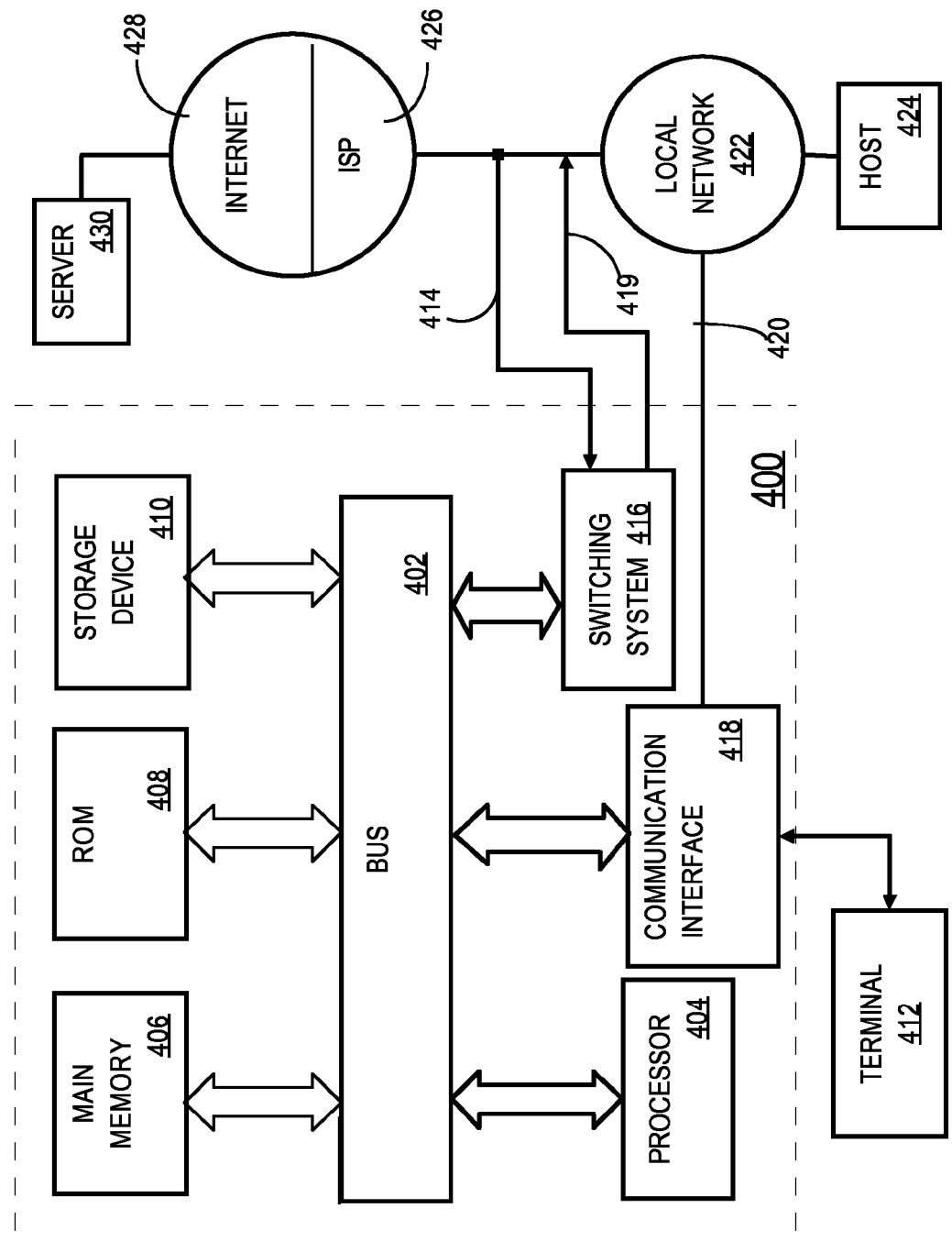
FIG. 4 illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for performing SNMP-based polling of objects in an MIB. According to one embodiment of the invention, the performance of SNMP-based polling of objects in an MIB is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile storage media, volatile storage media, and transmission media. Non-volatile storage media includes, for example, optical or magnetic disks, such as storage device 410. Volatile storage media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the performance of SNMP-based polling of objects in an MIB as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising steps of:
    detecting, by a Simple Network Management Protocol (SNMP) agent residing on a managed device, that one or more objects in a management information base (MIB) of said managed device have changed;
    said SNMP agent generating a bitmap containing a plurality of bits, wherein each bit of the plurality of bits indicates whether an individual object of said MIB has changed or has not changed;
    wherein generating the bitmap includes at least setting bits, of the plurality of bits, which correspond to the one or more objects to indicate that the one or more objects have changed; and
    said SNMP agent storing said bitmap on said managed device for later access by a network management system (NMS) that resides on another device that is communicatively coupled to said managed device through a computer network;
    wherein said steps are performed by one or more computing devices.

2. A method as claimed in claim 1, further comprising:
    receiving, at said managed device, over said computer network, a request from said NMS; and
    in response to said request, sending said bitmap over said computer network to said NMS.

3. A method as claimed in claim 1, further comprising:
    receiving, at said managed device, over said computer network, a request from said NMS;
    in response to said request, sending said bitmap over said computer network to said NMS;
    after sending said bitmap to said NMS, receiving, at said managed device, from said NMS, a request to poll a single specified object that said NMS determined, based on said bitmap, to have changed; and
    in response to said request to poll said single object, sending, to said NMS, over said computer network, information about said specified object and no other object within said MIB;
    wherein said NMS does not store an entire copy of said MIB;
    wherein said NMS does not compare a current value of said specified object with any value stored at said NMS in order to determine whether said current value is different from a previous value of said specified object.

4. A method as claimed in claim 1, wherein said SNMP agent generating said bitmap comprises:
    said SNMP agent determining that a value of a particular object of said MIB has changed; and
    in response to said SNMP agent determining that said value of said particular object has changed, said SNMP agent setting a bit within a bit field of a changedObjects object that is a sibling of said particular object in said MIB;
    wherein setting said bit comprises setting a bit at a position within said bit field that is located at a same position among bits of said bit field as a position at which said particular object is located among siblings of said particular object in said MIB.

5. A method as claimed in claim 1, wherein said SNMP agent generating said bitmap comprises:
    said SNMP agent determining that a value of a particular object of said MIB has changed;
    in response to said SNMP agent determining that said value of said particular object has changed, said SNMP agent setting a first bit within a bit field of a changedObjects object that is a sibling of said particular object in said MIB;
    wherein setting said first bit comprises setting a bit at a position within said bit field that is located at a same position among bits of said bit field as a position at which said particular object is located among siblings of said particular object in said MIB; and
    in response to said SNMP agent determining that said bit field of said changedObjects object has changed due to said first bit being set, said SNMP agent setting a second bit within said bit field;

wherein setting said second bit comprises setting a bit at a position within said bit field that is located at a same position among bits of said bit field as a position at which said changedObjects object is located among siblings of said particular object in said MIB.

6. A method as claimed in claim 1, wherein said SNMP agent generating the bitmap comprises:
   said SNMP agent determining that a value of a monitorObjects object in said MIB has been set to a value that indicates that a session has ended;
   in response to said SNMP agent determining that said value of said monitorObjects object in said MIB has been set to said value that indicates that said session has ended, said SNMP agent locating, within said MIB, a parent object that has a child object that contains a first bit field that indicates which siblings of said child object have changed during said session; and
   said SNMP agent replacing (a) a bit of a second bit field of a sibling of said parent object with (b) a value of said first bit field.

7. A method as claimed in claim 1, wherein said SNMP agent setting said bits comprises:
   said SNMP agent locating, within said MIB, a parent object that has a child object that contains a first bit field that indicates which siblings of said child object have changed during said session;
   said SNMP agent locating, within said MIB, a particular changedObjects object that is a sibling of said parent object within said MIB; said SNMP agent replacing (a) a particular bit of a second bit field contained within said particular changedObjects object with (b) a value of said first bit field;
   wherein replacing said particular bit comprises replacing a bit at a position within said second bit field that is located at a same position among bits of said second bit field as a position at which said parent object is located among siblings of said parent object in said MIB.

8. An apparatus comprising:
   a Simple Network Management Protocol (SNMP) agent residing on said apparatus, wherein:
      said SNMP agent is configured to detect that one or more objects in a management information base (MIB) of said apparatus have changed, and
      said SNMP agent is configured to generate a bitmap containing a plurality of bits, wherein each bit of the plurality of bits indicates whether an individual object of said MIB has changed or has not changed by at least setting bits, of the plurality of bits, which correspond to the one or more objects to indicate that the one or more objects have changed; and
   a storage mechanism that is configured to store said bitmap on said apparatus for later access by a network management system (NMS) that resides on another device that is communicatively coupled to said apparatus through a computer network.

9. An apparatus as claimed in claim 8, further comprising:
   a receiving mechanism that is configured to receive, at said apparatus, over said computer network, a request from said NMS; and
   a sending mechanism that is configured to send said bitmap over said computer network to said NMS in response to said request.

10. An apparatus as claimed in claim 8, further comprising:
   a receiving mechanism that is configured to receive, at said apparatus, over said computer network, a request from said NMS;
   a sending mechanism that is configured to send said bitmap over said computer network to said NMS in response to said request;
   said receiving mechanism that is configured to receive, from said NMS, after said bitmap has been sent to said NMS, a request to poll a single specified object that said NMS determined, based on said bitmap, to have changed; and
   said sending mechanism that is configured to send, to said NMS, over said computer network, in response to said request to poll said single object, information about said specified object and no other object within said MIB.

11. An apparatus as claimed in claim 8, wherein said SNMP agent is configured to:
   determine that a value of a particular object of said MIB has changed and in response set a bit within a bit field of a changedObjects object that is a sibling of said particular object in said MIB by setting said bit at a position within said bit field that is located at a same position among bits of said bit field as a position at which said particular object is located among siblings of said particular object in said MIB.

12. An apparatus as claimed in claim 8, wherein said SNMP agent is configured to:
   determine that a value of a particular object of said MIB has changed and in response set a first bit within a bit field of a changedObjects object that is a sibling of said particular object in said MIB by setting said first bit at a position within said bit field that is located at a same position among bits of said bit field as a position at which said particular object is located among siblings of said particular object in said MIB; and
   set, responsive to a determination that said bit field of said changedObjects object has changed due to said first bit being set, a second bit within said bit field by setting said second bit at a position within said bit field that is located at a same position among bits of said bit field as a position at which said changedObjects object is located among siblings of said particular object in said MIB.

13. An apparatus as claimed in claim 8, wherein said SNMP agent is configured to:
   determine that a value of a monitorObjects object in said MIB has been set to a value that indicates that a session has ended and in response locate, within said MIB, a parent object that has a child object that contains a first bit field that indicates which siblings of said child object have changed during said session; and
   replace (a) a bit of a second bit field of a sibling of said parent object with (b) a value of said first bit field.

14. An apparatus as claimed in claim 8, wherein said SNMP agent is configured to:
   locate, within said MIB, a parent object that has a child object that contains a first bit field that indicates which siblings of said child object have changed during said session;
   locate, within said MIB, a particular changedObjects object that is a sibling of said parent object within said MIB; and
   replace (a) a particular bit of a second bit field contained within said particular changedObjects object with (b) a value of said first bit field by replacing said particular bit at a position within said second bit field that is located at a same position among bits of said second bit field as a position at which said parent object is located among siblings of said parent object in said MIB.

15. Logic encoded in one or more non-transitory media for execution and when executed operable to:
- detect, by a Simple Network Management Protocol (SNMP) agent residing on a managed device, that one or more objects in a management information base (MIB) of said managed device have changed;
- generate, by said SNMP agent, a bitmap containing a plurality of bits, wherein each bit of the plurality of bits indicates whether an individual object of said MIB has changed or has not changed, by at least setting bits, of the plurality of bits, which correspond to the one or more objects to indicate that the one or more objects have changed; and
- store, by said SNMP agent, said bitmap on said managed device for later access by a network management system (NMS) that resides on another device that is communicatively coupled to said managed device through a computer network.

16. Logic encoded on one or more non-transitory media as claimed in claim 15, said logic further operable to:
- receive, at said managed device, over said computer network, a request from said NMS;
- in response to said request, sending said bitmap over said computer network to said NMS;
- after sending said bitmap to said NMS, receiving, at said managed device, from said NMS, a request to poll a single specified object that said NMS determined, based on said bitmap, to have changed; and
- in response to said request to poll said single object, sending, to said NMS, over said computer network, information about said specified object and no other object within said MIB;
- wherein said NMS does not store an entire copy of said MIB;
- wherein said NMS does not compare a current value of said specified object with any value stored at said NMS in order to determine whether said current value is different from a previous value of said specified object.

17. Logic encoded on one or more non-transitory media as claimed in claim 15, wherein when executing the logic, SNMP agent at least:
- determines that a value of a particular object of said MIB has changed; and
- responsive to said determining that said value of said particular object has changed, sets a bit within a bit field of a changedObjects object that is a sibling of said particular object in said MIB;
- wherein said SNMP agent sets said bit at a position within said bit field that is located at a same position among bits of said bit field as a position at which said particular object is located among siblings of said particular object in said MIB.

18. Logic encoded on one or more non-transitory media as claimed in claim 15, wherein, when executing the logic said SNMP agent at least:
- determines that a value of a particular object of said MIB has changed;
- responsive to determining that said value of said particular object has changed, sets a first bit within a bit field of a changedObjects object that is a sibling of said particular object in said MIB;
- wherein said SNMP agent sets said first bit at a position within said bit field that is located at a same position among bits of said bit field as a position at which said particular object is located among siblings of said particular object in said MIB; and
- responsive to determining that said bit field of said changedObjects object has changed due to said first bit being set, sets a second bit within said bit field;
- wherein said SNMP agent sets said second bit at a position within said bit field that is located at a same position among bits of said bit field as a position at which said changedObjects object is located among siblings of said particular object in said MIB.

19. Logic encoded on one or more non-transitory media as claimed in claim 15, wherein when executing the logic, said SNMP agent at least:
- determines that a value of a monitorObjects object in said MIB has been set to a value that indicates that a session has ended;
- responsive to determining that said value of said monitorObjects object in said MIB has been set to said value that indicates that said session has ended, locates, within said MIB, a parent object that has a child object that contains a first bit field that indicates which siblings of said child object have changed during said session; and
- replaces (a) a bit of a second bit field of a sibling of said parent object with (b) a value of said first bit field.

20. Logic encoded on one or more non-transitory media as claimed in claim 15, wherein, generate said bitmap when executing the logic, said SNMP agent at least:
- locates, within said MIB, a parent object that has a child object that contains a first bit field that indicates which siblings of said child object have changed during said session;
- locates, within said MIB, a particular changedObjects object that is a sibling of said parent object within said MIB; and
- replaces (a) a particular bit of a second bit field contained within said particular changedObjects object with (b) a value of said first bit field;
- wherein said SNMP agent replaces said particular bit at a position within said second bit field that is located at a same position among bits of said second bit field as a position at which said parent object is located among siblings of said parent object in said MIB.

* * * * *